Jan. 14, 1964   N. H. UNTERBORN   3,117,739
ALTERNATE SPINDLE DRIVE MECHANISM
Filed Jan. 16, 1962

Norman H. Unterborn
INVENTOR.

BY R. Frank Smith

Paul P. Holmes
ATTORNEYS

United States Patent Office 3,117,739
Patented Jan. 14, 1964

3,117,739
ALTERNATE SPINDLE DRIVE MECHANISM
Norman H. Unterborn, Rochester, N.Y., assignor to Eastman Kodak Company, Rochester, N.Y., a corporation of New Jersey
Filed Jan. 16, 1962, Ser. No. 166,495
5 Claims. (Cl. 242—55.12)

This invention relates to an alternate spindle drive mechanism such as might be used for winding and rewinding strip material.

The alternate spindle drive mechanism was originally devised for moving film in a projection film reader from a supply to a take-up reel or from the take-up reel back onto the supply reel during use of the reader. It will be appreciated by those skilled in the art that the alternate spindle drive mechanism which is hereinafter described could be used in various other kinds of apparatus where it is desired to wind strip material onto either of two receiving spools.

Many kinds of apparatus for winding and/or rewinding strip material from one spool to another have been devised. Such apparatus is frequently incorporated in various photographic equipment such as projection film readers, editors, cameras, printers and enlargers. Often in such apparatus the forces developed by the engagement of one drive gear with another is used to shift the position of one of the gears thereby engaging or disengaging a clutch and selectively driving one or the other of two spindles depending upon the direction of rotation of the gears. Where the driven gear is, for example, a worm, the magnitude of the force which tends to shift the position of the worm, and thereby engage or disengage the associated clutch, depends upon the helix angle of the gears and it has been found insufficient, under some circumstances of use, to drive the clutch to its fully engaged position or to maintain the clutch fully engaged. At certain times, for example, when the drive of the spindles is slowed, the inertia of the driven spindle, and the spool carried thereby is such that the spindle rotates faster than the worm which drives it with the result that the clutch disengages and the spindle tends to freewheel. Still another difficulty sometimes encountered with such an arrangement is the failure of the movable gear to shift its position immediately upon changing the direction of the rotation of the other gear. This can be caused by dust, inertia or other mechanical reasons but the result is the same; that is, that the apparatus jams, and/or the strip is not moved. Broadly, the alternate spindle drive mechanism of the present invention comprises means for insuring that the movable gear in such an apparatus is shifted immediately with the changing of direction of rotation of the drive gear and that the associated clutch or clutches function positively and without unintentional engagements or disengagements. This is accomplished by a friction element associated with each drive gear and engaging the driven gear during rotation of the drive gear to urge the driven gear in the direction corresponding to the direction of such rotation.

The primary object of the present invention is, therefore, to provide an improved alternate spindle drive mechanism.

Another object of the present invention is to provide a device for securing prompt engagement and disengagement of spindle clutches upon reversing the direction of the rotation of the drive mechanism for the spindles.

Another object of the present invention is to provide a simple film reeling mechanism which is relatively inexpensive to manufacture and yet is completely reliable in use.

Still other objects and advantages of the present invention will become readily apparent to those skilled in the art from the following description with reference to the drawings in which like characters denote like parts and wherein.

Figure 1:
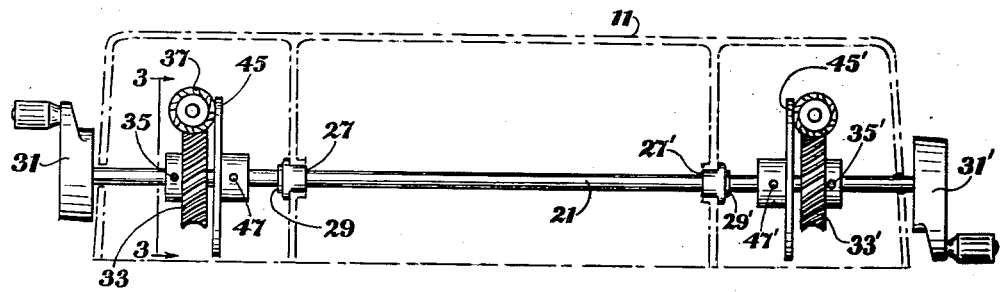
FIG. 1 is a front elevation view showing the alternate spindle drive mechanism of the present invention.

The structure indicated in phantom in the drawings represents the spools and portion of the housing structure of a projection film reader with which the alternate spindle drive mechanism of the present invention can be utilized.

Figure 2:
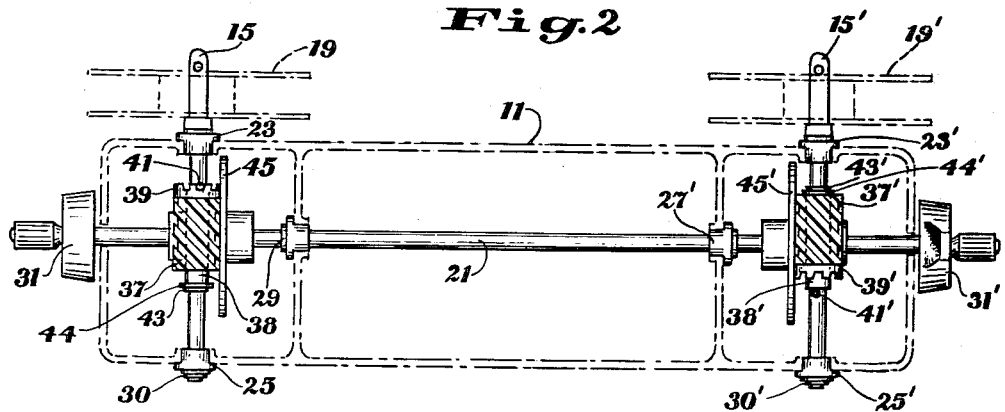
FIG. 2 is a top plan view thereof.
Figure 3:
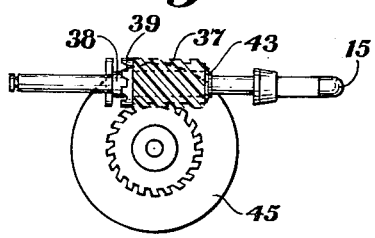
FIG. 3 is a side elevation taken along line 3—3 of FIG. 1 and showing the spindle clutch which is incorporated in the drive mechanism of the present invention.

In FIG. 1, the numeral 11 designates the housing of the projection film reader, which encloses the alternate spindle drive mechanism. The alternate spindle drive mechanism comprises a spindle 15 and a spindle 15' which are adapted to receive and drive film spools 19 and 19' respectively from a drive shaft 21. Spindles 15 and 15' are mounted for rotation in the housing 11 by means of suitable front and rear bearings 23, 23' and 25, 25' as shown in FIG. 2. Shaft 21 is also rotatably mounted in housing 11 by means of bearings 27 and 27'. Spring clips 29 and 29' which snap over annular grooves formed in the shaft 21 hold the shaft in position longitudinally of the housing. Similar clips 30 and 30' are provided to locate spindles 15 and 15' in housing 11. The opposite ends of the shaft 21 carry hand cranks 31 and 31' by means of which rotation can be manually imparted to shaft 21. Driving gears 33 and 33' are fixed on shaft 21 by means of set screws 35 and 35' respectively, for engagement with worms 37 and 37'. Worms 37 and 37' are mounted on spindles 15 and 15' respectively for rotation with respect to the spindles and for slidable movement axially of the spindles. The worms are slidably mounted on bearing sleeves 38 and 38' and are provided with clutch faces 39 and 39' respectively, for engaging the clutch pins 41 and 41' carried by the spindles 15 and 15'. When a clutch face is engaged with its clutch pin, rotation of the worm is imparted to the spindle. Spindles 15 and 15' also carry stop members in the form of spring clips 43 and 43' (similar to clips 29 and 30) to limit the sliding movement of the worms on the spindles. The clips are backed by washers 44 and 44' which are of sufficient diameter to engage the end face of the worms. Shaft 21 also carries friction disks 45 and 45' which are rigidly mounted on the shaft by suitable means such as set screws 47 and 47' respectively. The disks 45 and 45' which can be made of metal, plastic or other suitable material, are mounted on the shaft 21 so that one of the flat surfaces thereof is in sliding frictional contact with the periphery of associated worms 37 and 37'.

The operation of the alternate drive spindle mechanism will now be described. Let us assume that spool 19 is a take-up or receiving spool and that spool 19' is a supply spool which contains strip material, not shown, which is to be wound onto the spool 19. After one end of the strip material is attached to the hub of spool 19, the operator turns crank 31' in a clockwise direction or crank 31 in a counterclockwise direction so that worm 37' is moved by the force imparted by friction disk 45' to the position shown in FIG. 2, wherein clutch face 39' is disengaged from pin 41' and the end of worm 37' bears against washer 44' and stop 43'. In this position, rotation is not transmitted to spindle 15'. Of course, worm 37' continues to rotate because of the engagement of gear 33'. At the same time, friction disk 45 causes worm 37 to move to the position shown in FIG. 2 so that clutch face 39 positively engages pin 41 and spindle 15 is driven. Thus, the strip material is wound on the spool 19 and and is unwound from spool 17 since the spindle 15′ is free to rotate with respect to worm 37′. When the direction of rotation of the cranks 31 and 31′ is reversed, worm 37′ engages pin 41′ to thereby drive spindle 15′ and worm 37 disengages pin 41 thereby permitting spindle 15 to rotate freely with respect to worm 37, the result being that the strip material is wound back onto spool 15′.

It will be seen that the sliding frictional contact of the disk with its associated worm keeps the worm and its clutch under the control of the operator at all times. During shifting movement the worm is rotatably driven by the disk for engagement (or disengagement as the case may be) with the associated clutch, and during driving of the spindle the worm is constantly urged by the disk to its clutch engaging position. The worm cannot back off during deceleration of the spindle drive. These features not embodied in the known spindle drive mechanisms distinguish the present invention and render the same highly successful for use by the trade.

The invention has been described in detail with particular reference to preferred embodiments thereof but it will be understood that variations and modifications such as for example the incorporating of springs for resiliently and/or adjustably urging the disks into contact with the worms, or a motor, as opposed to a manually driven shaft, can be effected within the spirit and scope of the invention as described hereinabove and as defined in the appended claims.

Having now particularly described my invention, what I desire to secure by Letters Patent of the United States and what I claim is:

1. In an apparatus having:
   (a) a shaft,
   (b) a pair of parallel spindles to be selectively driven in opposite directions by said shaft,
   (c) clutch means operatively associated with said spindles for transmitting from said shaft rotation thereof in one direction to one of the spindles and rotation of the opposite direction to the other spindle,
   (d) distinct drivable means, each having a rotatable periphery and being fixed on portions of said clutch means, and slidable longitudinally of its associated spindle between a first position wherein the clutch means on such spindle is engaged and a second position wherein such clutch means is disengaged, and
   (e) drive means fixed on said shaft for driving said drivable means, the improvement which comprises:
       (1) means fixed on said shaft in sliding frictional contact with said periphery of the drivable means for selectively moving the same to either of said first and second positions depending upon the direction of rotation of said shaft.

2. In an apparatus having:
   (a) a shaft,
   (b) a pair of parallel spindles to be selectively driven in opposite directions by said shaft,
   (c) clutch means operatively associated with said spindles for transmitting from said shaft rotation thereof in one direction to one of the spindles and rotation of the opposite direction to the other spindle,
   (d) two driven gears mounted for rotation about said pair of spindles respectively, each gear carrying one portion of said clutch means and being slidable axially of its spindle between a first position wherein the clutch means associated with such spindle and gear is engaged and a second position wherein such clutch means is disengaged, and
   (e) gear means fixed on said shaft for driving said driven gears, the improvement which comprises:
       (1) friction members fixed on said shaft in sliding frictional contact with the periphery of said driven gears for moving the same to either of said first and second positions depending upon the direction of rotation of said shaft.

3. The improvement in accordance with claim 2 and wherein each of said friction members comprises a disk having a planar surface for slidably engaging the periphery of one of the driven gears.

4. In an apparatus having:
   (a) a rotatable shaft,
   (b) a spindle disposed in spaced angular relation to the shaft,
   (c) a worm mounted for rotation about said shaft and for longitudinal slidable movement with respect thereto between at least two spaced positions,
   (d) clutch means comprising one element carried by said worm and another element fixed on said spindle, said clutch elements being engaged when said worm is in one of said positions so that rotation of the worm is imparted to said spindle and disengaged when the worm is in another of said positions so that the worm is free to rotate with respect to the spindle, and
   (e) a drive gear fixed on said shaft for driving engagement with said worm regardless of the position thereof on said spindle, a device for selectively engaging and disengaging the clutch means to control the driving rotation of said spindle comprising:
       (1) a member mounted on said shaft and disposed in sliding frictional contact with the teeth which form the periphery of said worm for selectively moving the worm to either of said one and another positions depending upon the direction of rotation of said shaft.

5. In an apparatus having:
   (a) a rotatable shaft,
   (b) a spindle mounted in spaced rotation to said shaft and at substantially right angles thereto,
   (c) driven means having a periphery and mounted for rotation about said shaft and for longitudinal movement with respect thereto between at least two spaced positions,
   (d) clutch means comprising one element carried by said driven means and another element fixed on said spindle, said clutch elements being engaged when said driven means is in one of said positions so that rotation of the driven means is imparted to said spindle and disengaged when the driven means is in another of said positions so that the driven means is free to rotate with respect to the spindle, and
   (e) means fixed on said shaft for driving engagement with said driven means regardless of the position thereof on said spindle, a device for selectively engaging and disengaging the clutch means to control the driving rotation of said spindle comprising:
       (1) a disk mounted on said shaft and disposed in sliding frictional contact with said periphery of said driven means for selectively moving the driven means to either of said two positions depending upon the direction of rotation of said shaft.

References Cited in the file of this patent

UNITED STATES PATENTS 991,521    Maize ------------------ May 9, 1911